(12) United States Patent
James et al.

(10) Patent No.: US 11,576,517 B2
(45) Date of Patent: Feb. 14, 2023

(54) BEVERAGE BREWING APPARATUS AND RELATED METHOD

(71) Applicants: Timothy Darryl James, Midland, TX (US); David Bradford Wiley, Austin, TX (US)

(72) Inventors: Timothy Darryl James, Midland, TX (US); David Bradford Wiley, Austin, TX (US)

(*) Notice: Subject to any disclaimer, the term of this patent is extended or adjusted under 35 U.S.C. 154(b) by 586 days.

(21) Appl. No.: 16/538,748

(22) Filed: Aug. 12, 2019

(65) Prior Publication Data
US 2019/0357719 A1    Nov. 28, 2019

Related U.S. Application Data

(62) Division of application No. 15/220,648, filed on Jul. 27, 2016, now Pat. No. 10,376,088.

(60) Provisional application No. 62/198,118, filed on Jul. 28, 2015.

(51) Int. Cl.
| | |
|---|---|
| *A47J 31/20* | (2006.01) |
| *A47J 31/12* | (2006.01) |
| *A47J 31/52* | (2006.01) |
| *A47J 31/56* | (2006.01) |
| *A23F 5/26* | (2006.01) |
| *A47J 31/34* | (2006.01) |
| *A23F 5/24* | (2006.01) |

(52) U.S. Cl.
CPC ............. *A47J 31/20* (2013.01); *A23F 5/26* (2013.01); *A47J 31/12* (2013.01); *A47J 31/52* (2013.01); *A47J 31/56* (2013.01); *A23F 5/24* (2013.01); *A47J 31/34* (2013.01)

(58) Field of Classification Search
CPC .. A47J 31/12; A47J 31/18; A47J 31/20; A47J 31/34
USPC .................. 99/293, 297, 317, 322
See application file for complete search history.

(56) References Cited

U.S. PATENT DOCUMENTS

| | | | | |
|---|---|---|---|---|
| 5,992,300 | A * | 11/1999 | Fukushima | A47J 31/408 99/302 R |
| 2012/0100275 | A1* | 4/2012 | Bishop | A47J 31/32 366/139 |
| 2013/0220137 | A1* | 8/2013 | Bombeck | A47J 31/54 99/287 |
| 2015/0265092 | A1* | 9/2015 | Baba | A47J 31/44 99/283 |
| 2016/0198886 | A1* | 7/2016 | Avins | A47J 31/3671 99/302 R |

* cited by examiner

*Primary Examiner* — Reginald Alexander
(74) *Attorney, Agent, or Firm* — Sheppard, Mullin, Richter & Hampton LLP

(57) ABSTRACT

The present inventive concept consists of a logic controlled submersion brewing device that operates reliably with minimal user interaction. The brewer employs a submersion brewing technique to ensure a uniform extraction of beverage from solid extraction media. The device may be programmable to start on a timer. Parameters of the brew program may be customizable including serving size and extraction settings. The device will use vapor pressure to forcibly move beverage liquid across a sieve thereby separating the liquid from spent extraction media. Reliability and repeatability of the separation procedure is enhanced using a novel method of pressure control.

15 Claims, 4 Drawing Sheets

BEVERAGE BREWING APPARATUS AND RELATED METHOD

CROSS REFERENCE TO RELATED APPLICATIONS

This application is a divisional of U.S. patent application Ser. No. 15/220,648 filed on Aug. 13, 2016, which claims the benefit of U.S. Provisional Application No. 62/198,118 filed Jul. 28, 2015.

BACKGROUND OF THE INVENTION

Field of the Invention

It is known that a growing segment of consumers prepare artisanal beverages such as tea and coffee at home, and buy high end coffee and tea from natural grocers and roasters. Manual beverage extraction devices such as the Aeropress, French coffee press, and pour-over ceramics are increasing in popularity, with post-millennial and millennial generations over-indexing in the use of such appliances. Consumers who have grown up with specialty tea and coffeehouses are more likely to own wider varieties of beverage makers, and are likely to enjoy replicating the coffee- or tea-house experience at home. The present inventive concept consists of a logic controlled submersion brewing device that operates reliably with minimal user interaction.

Description of Related Art

Devices for extracting a brewed beverage from a solid base can be separated broadly into two categories:
  Manual beverage brewing devices, such as the French press and pour-over cone, which despite their labor intensive preparation are popular among consumers due to the favorable taste that they produce and ritual involved in preparing the beverage.
  Brewing appliances for home or enterprise use, which seek to automate one or more stages of the beverage preparation process.

Numerous problems were identified with existing brewing methods and devices. Typically the devices that perform well in terms of brewing consistency and controllability require significant user intervention. Submersion brewing, such as the traditional French press method, is widely regarded as the optimal method for consistently producing uniformly extracted and pleasant tasting beverages. Current methods of further automating this submersion brewing process result in one or more of the following: increased device complexity and device production costs, decreased device reliability, or decreased repeatability of the brewing process.

It is therefore desirable to have a submersion brewing device which can be operated with minimal user interaction in order to produce uniformly extracted beverages in a consistent and reliable manner.

SUMMARY OF THE INVENTION

The present inventive concept consists of a logic controlled submersion brewing device that operates reliably with minimal user interaction. In one embodiment, the system comprises a boiler module in fluid communication with a reservoir tank. A logic-controller regulates the interaction of both liquid and pressurized vapor between the boiler and an extraction chamber. Within the extraction chamber, solid base extraction media and extraction liquid react in a manner monitored and regulated by the logic controller in order to achieve an optimal and uniform extraction of beverage from the solid extraction media. Parameters of the extraction program may be customizable including serving size and extraction variables such as temperature, time, agitation and pressure. Additionally, the brewing process may be programmable to start on a timer. No moving parts are required to accomplish beyond simple valves actuated by the logic controller. Once the extraction of organic compounds from the solid extraction media has reached a desirable level, a logic-controlled system of provides vapor pressure from the boiler module to forcibly move beverage liquid across a sieve, thereby separating the beverage liquid from spent extraction media. Reliability and repeatability of the separation procedure is enhanced using a novel method of pressure control.

Once the extraction of organic compounds from the solid extraction media has reached a desirable level, the logic-controller allows the boiler to provide vapor pressure to the extraction chamber to forcibly move beverage liquid across a sieve, thereby separating the beverage liquid from spent extraction media. Reliability and repeatability of the separation procedure is enhanced using a novel method of pressure control.

The operational program may analyze data from any or all of the available sensors positioned on the device in order to monitor the brewing process and adjust for any non-ideal conditions, such as temperature fluctuations in the brewing chamber or blockage of the sieve. The operational program rectifies these situations by actuating valves.

In the event of a sieve blockage, the device utilizes a novel method of pressure control in which pressures are rapidly fluctuated across the length of the brewing chamber and sieve module, which serves to break up compaction in the extraction solid forming above the sieve.

The operational program is programmable, customizable, and designed to maintain enhanced extraction repeatability with minimal user interaction.

The novel features and construction of the present invention, as well as additional objects thereof, will be understood more fully from the following description when read in connection with the accompanying drawings.

BRIEF DESCRIPTION OF THE DRAWINGS

The improved process of the invention is further described and explained in relation to the following figures of the drawings wherein.

Like reference numerals are used to describe like parts in all figures of the drawings.

DESCRIPTION OF THE PREFERRED EMBODIMENTS

Figure 1:
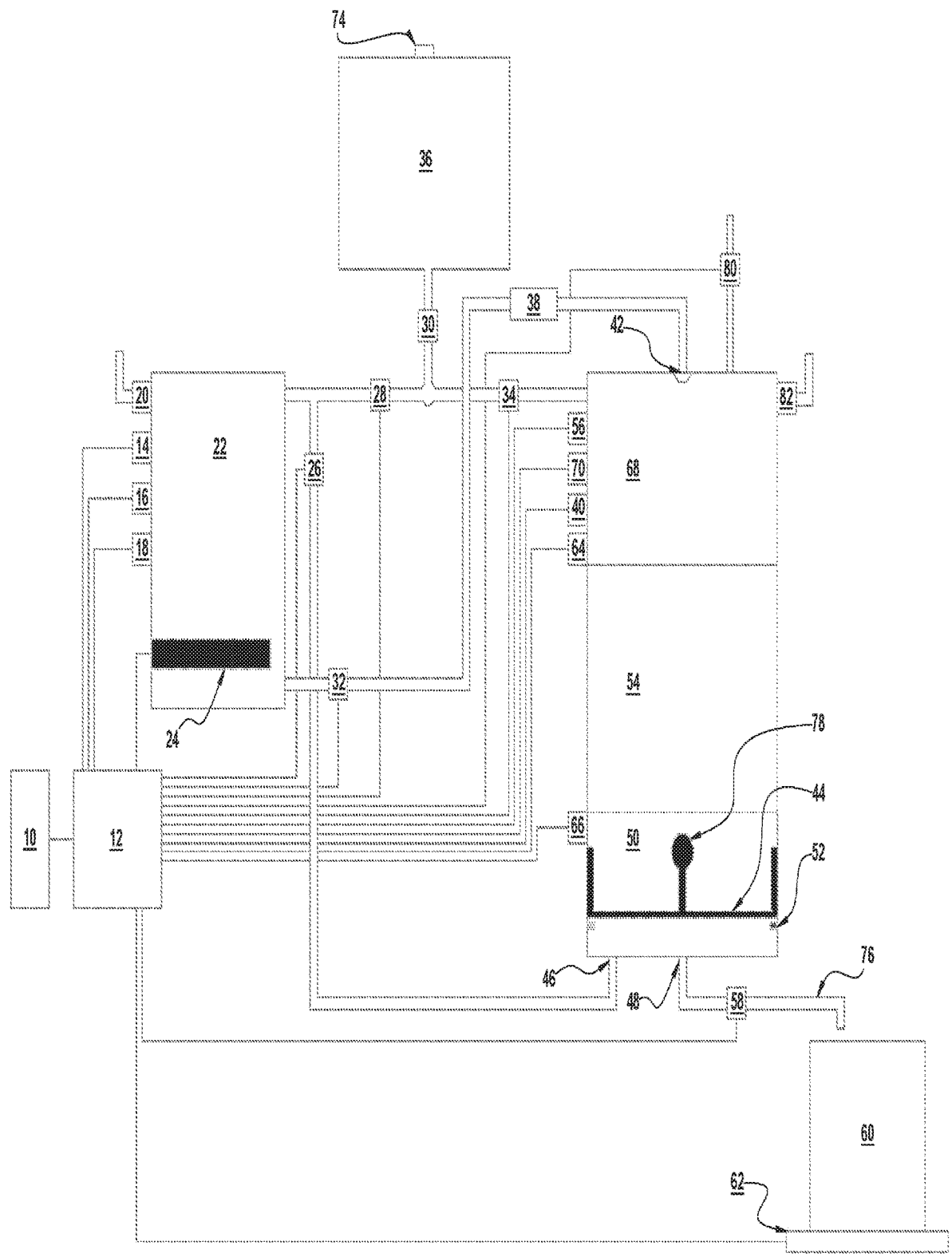
FIG. 1 is a block diagram of a typical embodiment of the present invention.
Figure 4:
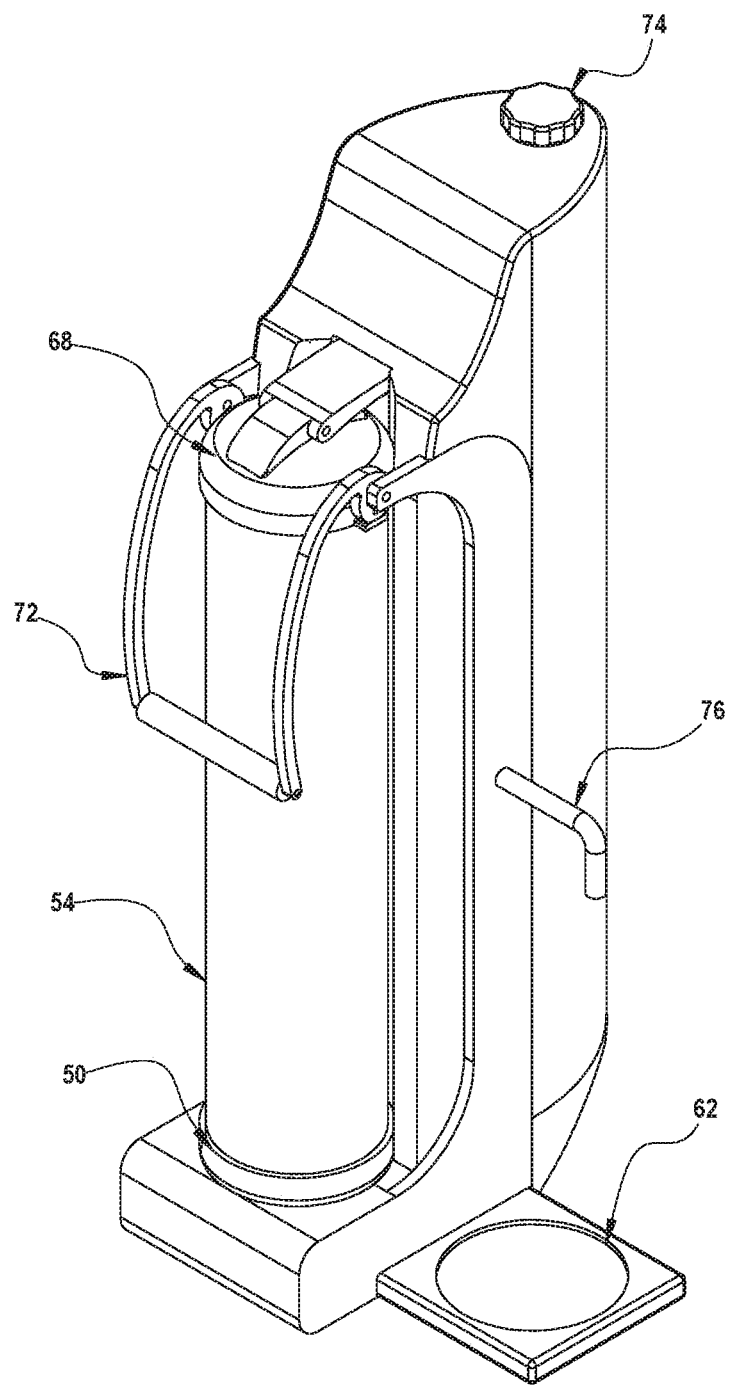
FIG. 4 is an isometric view of an exemplary embodiment showing the overall nature of the design.

Referring to FIG. 1, a reservoir tank 36, or alternatively a permanent tap, supplies the device with the working fluid, herein referred to as extraction fluid. Referring to FIG. 4, the reservoir tank 36 is user accessible via reservoir cap 74. Referring to FIG. 1, the boiler vessel 22, reservoir tank 36 and the extraction vessel upper section 68 are in fluid communication governed by the operational program via electromechanical valves. Extraction fluid introduced from the reservoir tank 36 is heated and pressurized within the boiler vessel 22 by a heat source 24, for example but not limited to a resistive electrical heating element, controlled by the operational program. External thermal insulation separating the interface between boiler and surrounding atmosphere is used to maximize thermal efficiency.

Still referring to FIG. 1, within the boiler vessel 22, a continuous level sensor 18 communicates liquid level to the operational program. This level sensor may be electrical, electromechanical, or radiative. Boiler pressure is communicated to the operational program via a continuous pressure sensor 16. Boiler temperature is communicated to the operational program via a continuous temperature sensor 14. Still referring to FIG. 1, a mechanical pressure relief valve 20 is in fluid communication with the boiler vessel. An embodiment may utilize multiple boilers in place of the single boiler described herein. An embodiment may utilize an external heat source for the boiler such as an electric or gas burner. This external heat source may or may not be controlled by the device operational program. An embodiment may use a discrete level sensor in conjunction with a flow meter in line between the reservoir tank 36 or tap and the boiler vessel. An embodiment may use one or more discrete pressure sensors in lieu of a continuous pressure sensor.

Figure 2:
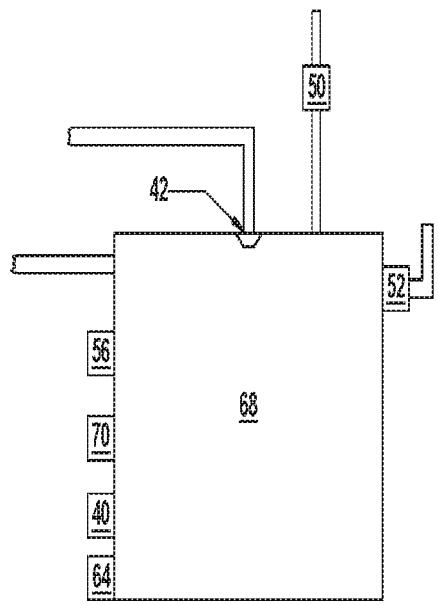
FIG. 2 is a block diagram of an exemplary embodiment of extraction chamber showing the nature of three segment design.
Figure 2:
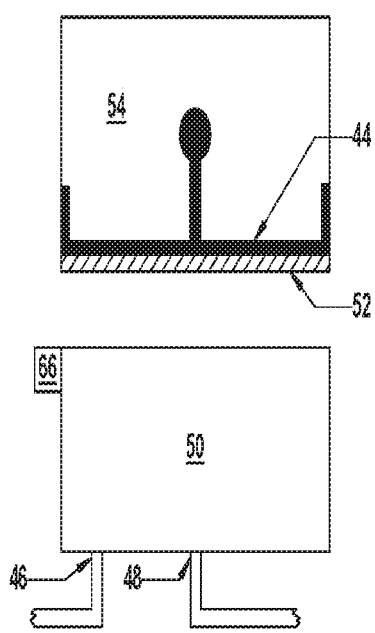
Figure 3:
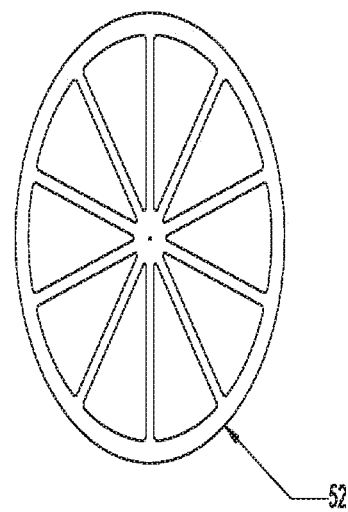
FIG. 3 is a plan view of an exemplary embodiment of sieve basket in extraction chamber lower section (sieve mesh not shown).

Referring to both FIG. 1 and FIG. 2, a removable sieve basket 44 is located in the lower section 50 of the extraction chamber and functions to separate the solid extraction source media from the extraction liquid. An isolated plan view of the sieve basket 44 is shown in FIG. 3. The sieve basket 44 will provide a support structure for filter media that may be comprised of paper, woven fiber, metallic screen, or any other material that is of capable of preventing transmission of solids out of the extraction vessel lower section 50 while also being of sufficient permeability to allow timely fluid communication between the extraction vessel and the dispensing line 48. The sieve basket 44 will be appropriately sized to fully seal against the inner wall of the extraction vessel and will be removable for solid extraction media removal and cleaning. An embodiment of the sieve basket 44 may have an access handle 78 to facilitate removal. Appropriately sized filters or screens may be exchanged, stacked, or otherwise varied to achieve the necessary filter properties for the solid extraction media being used. Filters and screens have been omitted from the figures for clarity.

Figure 5:
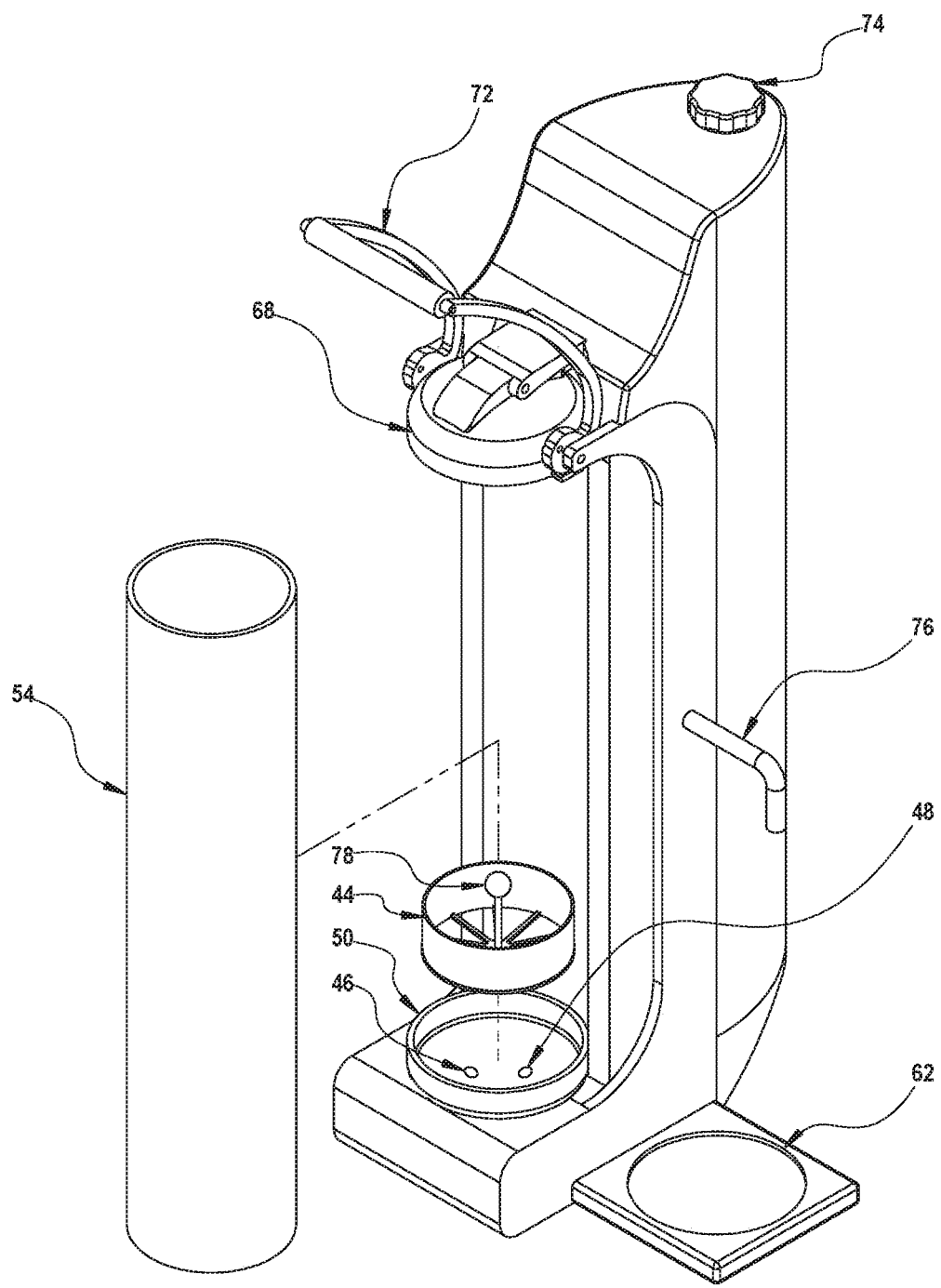
FIG. 5 is an exploded isometric view of the exemplary embodiment shown in FIG. 4 illustrating disassembly of the extraction vessel.

Referring to FIG. 1, FIG. 2 and FIG. 5 an embodiment may use a prepackaged cartridge or capsule including solid extraction media and filter media, hereafter referred to as a cartridge, which may be used in place of stand-alone filter or screen. The access handle 78 may be removed to facilitate use of a cartridge. The extraction vessel lower section 50 contains a fixed sieve support ring 52, shown in FIG. 1 and FIG. 2 to maintain the sieve basket 44 some height above the bottom of the lower section 50. An embodiment may allow the sieve basket 44 to be locked against the sieve support ring 52.

Referring to both FIG. 1 and FIG. 2, the sieve support ring 52 is located in the lower section 50 of the extraction vessel allowing some volume between the sieve basket 44 and the dispensing line 48. Referring to FIG. 1 and FIG. 4 this volume allows time for the extraction vessel upper section 68, middle section 54 and lower section 50 to be isolated from the boiler vessel 22 during the dispensing process, to prevent excessive pressurized vapor from exiting from the dispensing spout 76.

The extraction vessel is segregated to allow fixed process connections while also allowing user full access to the sieve area for cleaning and the addition and removal of solid extraction media or cartridges. Referring to FIG. 1, FIG. 2 and FIG. 5, the middle section of the extraction vessel 54 is removable allowing the user access to the sieve basket 44. FIG. 5 shows an exemplary embodiment with the middle section of the extraction vessel 54 and the sieve basket 44 removed from the device. Sealing methods, such as, but not limited to compression gaskets, cylinder packing or toric joints are utilized between component sections to maintain the fluid and vapor integrity of the extraction vessel. The component sections of the extraction vessel may be locked in place with one or more additional mechanisms such as, but not limited to, cam levers or over center clamps. FIG. 4 and FIG. 5 show an exemplary embodiment that utilizes a cam lever handle 72 to lock component sections of the extraction vessel in place. Alternatively, an embodiment may utilize a threaded connections between the extraction upper section 68 and middle section 54 with a reverse threaded connection between the middle section 54 and lower section 50 to allow an operator access to the sieve basket 44 area. Referring to both FIG. 1 and FIG. 2, closure sensors 64 66, such as but not limited to electrical contact switches, may be utilized between extraction vessel sections 68 54 50 to verify closure prior to introduction of liquid or pressure. An embodiment may utilize a pressure sensor 40 to supply the operational program with the pressure reading within the extraction chamber.

Referring to FIG. 1, fluid from the reservoir tank 36 or tap is introduced to extraction chamber upper section 68 via hydrostatic pressure or line pressure. Alternatively, an embodiment of the device could be plumbed such that movement of the reservoir fluid to the brew chamber is assisted by utilizing boiler pressure. While room temperature fluid is entering the extraction chamber, heated fluid is sprayed from nozzle 42 at extraction chamber upper section 68 and heated vapor is introduced from a port 46 in extraction chamber lower section 50 in a pattern governed by the operational program thereby maintaining a set temperature of fluid in the extraction vessel. Still referring to FIG. 1, liquid level in the extraction chamber is measured over a continuous range with liquid level sensor 56 allowing the operational program to halt the filling at the prescribed serving size. This sensor could be electrical, electromechanical, sonic, or radiative. An embodiment may utilize an inline flow meter in conjunction with or in lieu of the vessel liquid level sensor 56. Still referring to FIG. 1, an embodiment could contain a heat exchanging device that allows thermal commutation between boiler vessel 22 and reservoir tank 36 or tap fluid so that fluid entering extraction vessel through valve 34 enters at an elevated temperature. An embodiment could contain a separate vessel with separate heat source that preheats extraction fluid to a specified temperature prior to introduction into the extraction vessel. An embodiment could use a heat source within or adjacent to the extraction vessel in order to maintain temperature of the extraction fluid.

Referring to both FIG. 1 and FIG. 2, agitation of extraction fluid and solids is imparted by introduction of pressurized heated vapor from port 46 at extraction vessel lower section 50 at a frequency and duration governed by the operational program. Still referring to both FIG. 1 and FIG.

2, heated extraction fluid is sprayed under pressure from nozzle 42 at extraction vessel upper section 68 at a frequency and duration governed by the operational program to break up the conglomeration of solid media on or below the surface of the extraction fluid. An embodiment could contain a mechanical means of imparting vibration or oscillatory motion to the extraction vessel to create a turbulent state in the extraction fluid. Frequency of vibration and oscillation in said embodiment could range from subsonic to ultrasonic. An embodiment could contain a mechanically driven agitator to create turbulence in the extraction fluid.

Referring to FIG. 1, Boiler vessel 22 is equipped with a continuous temperature sensor 14 to supply information to the logic controller 12. Continuous temperature sensor 14 could be thermo-mechanical, radiative, or thermo-electrical. Introduction of heat energy from heat source 24 into boiler vessel 22 can be governed by the operational program with feedback from this continuous temperature sensor 14. Still referring to FIG. 1, temperature control in the extraction vessel is measured via a temperature sensor 70 in direct contact with or proximity to extraction fluid. Temperature sensor 70 could be thermo-mechanical, radiative, or thermo-electrical and may be located in the upper section 68 or lower section 50 of the extraction vessel. Nozzle 42, located in extraction vessel upper section 68 and commutable with liquid in boiler vessel 22 via valve 32, is utilized for solid liquid mixture agitation, temperature control, or both. A heat exchanging device 38 thermally commutable with the nozzle 42 and the atmosphere can be utilized to reduce the temperature of the boiler fluid to a temperature within an acceptable range of the extraction process. This heat exchanging device 38 could utilize either active or passive convection and could be controlled by the logic controller 12.

Still referring to FIG. 1, the operational program of the device can place the extraction vessel upper section 68 in direct fluid communication with the top of the boiler vessel 22, thereby increasing the pressure in the upper region of the extraction vessel. This communication is achieved by opening valve 28 and valve 34. The extraction chamber upper section 68 is in fluid communication with a mechanical pressure relief valve 82 located near the top of the vessel to purge the pressure should it ever exceed the extraction vessel's safe operating limits. While positive vapor pressure is being introduced to the extraction vessel, the operational program opens a valve 58 in line between the dispensing line 48 and the dispensing spout 76, putting these two areas in direct fluid commutation. The pressurized vapor in the upper area of the extraction vessel added with the hydrostatic pressure of the extraction fluid against the atmospheric pressure at the dispensing spout 76 forces the extraction fluid past the sieve basket 44 while isolating the solid particulate above the sieve basket 44 in the extraction vessel lower section 50. Still referring to FIG. 1, at the point where the extraction liquid level drops below the sieve basket 44, the boiler vessel 22 and extraction chamber upper section 68 are isolated by valves 28 34 so that the dispensing spout 76 and boiler vessel 22 are never in direct commutation. The remainder of the extraction liquid in the extraction chamber lower section 50 is forced out of the dispensing outlet 48, through dispensing spout 76, and into dispensing vessel 60 with the remaining pressure in the extraction vessel. An embodiment may utilize the extraction vessel vent valve 80 to purge all remaining pressure in the extraction vessel at this point and allow only the hydrostatic pressure of the fluid to complete the transfer to the dispensing vessel 60. The device includes a warming plate 62 in thermal contact with the dispensing vessel 60 to maintain a desired temperature. The warming plate 62 may additionally be controlled by the operational program to preheat a dispensing vessel 60 prior to dispensing in order to minimize cooling of the extraction fluid.

Referring to FIG. 1, the operational program may operate the extraction vessel vent valve 80 to further regulate pressure or otherwise enhance the extraction or dispensing processes. The operational program may analyze any or all of the available sensor readings to determine problems during the extraction process such as a blockage of the sieve basket 44. To maintain consistency during the time-sensitive extraction process, if the operational program detects a blockage or inadequate flow across the sieve basket 44 it may actuate vent valve 80 to rapidly purge pressure from the top of the extraction vessel. The operational program may vary the frequency and duration of this actuation. This fluctuation in pressure above the sieve basket 44 serves to break up compaction in the extraction solid forming above the sieve basket 44, allowing the device to resume normal flow in the solid-liquid separation process. Still referring to FIG. 1, the operational program may also choose to open valve 26 and close valve 58 to raise the pressure in the extraction vessel lower area to the higher vapor pressure in the boiler vessel 22 while the extraction vessel upper area is venting to atmospheric pressure in order to further break up compacted solids and restore flow. This process mimics the actions taken by those who use manual French press beverage brewers when they encounter a sieve blockage. An embodiment may allow vented to vapor to pass back into an open volume expansion chamber to cool and expand before venting to surrounding area. An embodiment may include a low pressure drop heat exchanger to allow vented vapor to cool and expand before entering surrounding area. The operational program for the device is administered via a programmable logic controller 12, for example but not limited to a microcontroller capable of discrete and analog input and output. This operational program uses feedback from sensors in the device to regulate the extraction process based on established or adjustable process parameters. Areas of control for the operational program may be, but are not limited to, thermal input to the boiler, timing of system functions, valve actuation, and user alerts or signals.

Referring to FIG. 1, Operators may interface with the operational control program to modify parameters via a controller interface device 10 or devices. These devices may be, but are not limited to, knobs, switches, touch screen displays, optical sensing devices, barcode or RFID readers, keypads, or buttons. An embodiment may allow an operator to interface with the logic controller 12 via separate technology devices. These devices may be, but are not limited to, personal computers, handheld electronic organizers, entertainment devices, automation centers, or cellular telephones. The link between the technology device and the logic device may be, but is not limited to, radiative data signals, wired electrical data signals, or existing technology data networks. A GUI or other software application for the operator's technology device may be provided to enhance the operator's control of the operational program. This GUI may be transmitted directly from the logic controller 12 over the communication link, an external networking source, or from physical storage media provided to the operator. An embodiment of the device may use discrete relay logic in conjunction with or in place of programming logic. An embodiment may allow the logic controller 12 access to a distributed database of standardized operational programs or other device settings via communication with an operator's technology device or through an existing network infrastructure.

Operational Summary

The following is an illustrative, but non-limiting, operational summary of the invention. Referring to FIG. 1, in the resting state valves 26 28 32 34 58 80 are closed. Referring to FIG. 1 and FIG. 4 the operator will fill the fluid reservoir tank 36 via the reservoir cap 74. Referring to FIG. 1, FIG. 3 and FIG. 5, to prepare the device for extraction the operator adds solid extraction media to the extraction chamber by accessing the removable middle section 54. The solid extraction media rests atop the sieve basket 44. The operator then reseats the center section against the lower section of the extraction vessel 50 and reseats the upper section of the extraction chamber 68 against the middle section 54. Any locking mechanisms are engaged. Referring to FIG. 1, the closure sensors 64 66 located on the upper 68 and lower 50 sections of the extraction vessel signal a seal to the logic controller 12.

Still referring to FIG. 1, the operator selects an operational program within the logic controller 12 through the controller interface device 10. Upon operator command or timer trigger, the extraction process begins by opening valve 28 allowing fluid from the reservoir tank 36 or tap to flow through check valve 30 into the boiler vessel 22, illustrated in FIG. 1. Once the continuous level sensor 18 in the boiler vessel 22 indicates a set level has been reached, valve 28 is closed. The heat source 24 in the boiler vessel 22 is activated. The continuous temperature sensor 14, continuous pressure sensor 16, and continuous level sensor 18 in the boiler vessel 22 are monitored by the logic controller 12 to verify in-range operation.

Still referring to FIG. 1, once the boiler vessel 22 has reached target pressure and temperature, logic controller 12 will maintain appropriate temperature and pressure throughout the process by modulating heat source 24 as necessary. Valve 34 is now opened to allow fluid from reservoir tank 36 or tap to enter the extraction vessel. Simultaneously, the logic controller 12 modulates valve 26 to meter hot vapor through port 46 in order to apply heat to the fluid entering the extraction vessel.

Still referring to FIG. 1, the logic controller 12 monitors the temperature measured by the temperature sensor 70 throughout the addition of fluid to the extraction vessel and continues to meter heated vapor through valve 26 to maintain the set temperature. Once the logic controller 12 reads the appropriate liquid level from liquid level sensor 56, valve 34 closes.

Still referring to FIG. 1, at one or more points in time during the extraction process, valve 32 is opened to spray hot fluid from the boiler vessel 22 through nozzle 42 in the upper section of the extraction vessel 68 to properly wet the solid extraction media and break up conglomerations. This may occur during the extraction vessel filling process, after the filling process, or both. This heated water is passed through a heat exchanging device 38 (shown in FIG. 1) prior to entering the extraction vessel to cool and more closely match the extraction process set temperature.

Still referring to FIG. 1, the logic controller 12 continues to monitor the extraction fluid temperature and opens valve 26 as necessary to increase extraction fluid set temperature. Once the programmed extraction time has elapsed, valves 58 28 34 are opened. Check valve 30 closes naturally due to the pressure below it. This places high pressure vapor in the upper area of the extraction vessel and exposes the lower area of the extraction vessel to atmospheric pressure via the dispensing line 48. This differential pressure forces the extraction fluid to move across the sieve basket 44 through the dispensing line 48 and into the dispensing vessel 60, while the solid extraction media is trapped above the sieve basket 44. The sieve support ring 52, attached to the extraction vessel lower section 50, maintains the position of the sieve basket 44 as it withstands the building downward force from the differential pressure.

Still referring to FIG. 1, the logic controller 12 monitors the extraction chamber pressure sensor 40 and the extraction vessel liquid level sensor 56 to check for blockage against the sieve basket 44. If blockage is detected, the device will break up the blockage by rapidly venting the stored pressure above the extraction fluid by briefly closing valve 34 and opening vent valve 80. This rapidly causes a reversal of the differential pressure in the system breaking up the solid blockage to allow fluid to flow through the sieve basket 44 again. Additionally, valve 26 may be opened and valve 58 closed to raise the pressure below the sieve basket 44 to further the differential pressure reversal. This pressure reversal procedure may be repeated or varied as necessary.

Still referring to FIG. 1, once the extraction fluid level has dropped below the sieve basket 44, valves 28 34 are closed and heat source 24 is deactivated. The remainder of the extraction fluid is forced out of the lower section of the extraction vessel 50 by the remaining vapor pressure in the upper area of the extraction vessel. Still referring to FIG. 1, the warming plate 62 is activated under the dispensing vessel 60 to maintain the extracted fluid at the desired temperature. Alternatively, the warming plate 62 may be activated prior to this point to preheat the dispensing vessel 60 prior to the introduction of extraction fluid.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

It should be emphasized that many variations and modifications may be made to the embodiments disclosed herein, the elements of which are to be understood as being among other acceptable examples. Accordingly, it should be understood that various features and aspects of the disclosed embodiments can be combined with or substituted for one another in order to form varying modes of the disclosed apparatus, systems, and methods. All such modifications and variations are to be intended and fall within the scope of the embodiments disclosed herein.

The invention claimed is:

1. A method for a submersion brewing apparatus comprising:
   providing a boiler vessel for heating extraction liquid to generate a heated extraction liquid and heating vapor to generate a pressurized vapor;
   providing a vapor and liquid tight extraction vessel with a sieve basket for holding extraction source media, the extraction vessel having an upper section and a lower section each in fluid communication with the boiler vessel, the sieve basket being completely contained in the lower section, the extraction vessel adapted to receive the heated extraction liquid and the pressurized vapor from the boiler vessel; and
   providing a dispensing line in fluid communication with the lower section; and providing an operational program to read sensor data and to control valves, the operational program for controlling flow of the heated extraction liquid and the pressurized vapor from the boiler vessel into the extraction vessel to apply positive vapor pressure above the heated extraction liquid in the extraction vessel to forcibly move the heated extraction liquid across the extraction source media in the sieve basket and out the dispensing line.

2. The method of claim 1 further comprising enabling a pressure reversal within the operational program using control valves to mitigate extraction media blockages.

3. The method of claim 1 further comprising providing a fluid reservoir in fluid communication with the boiler vessel.

4. The method of claim 1 wherein the extraction vessel further comprises a non-plumbed and removable middle section, wherein the upper, middle and lower sections of the extraction vessel form a single and continuous vapor and liquid tight extraction vessel when assembled.

5. The method of claim 1 further comprising providing the operational program and the valves to provide positive vapor pressure into the upper section and the lower section to bi-directionally force the heated extraction liquid and the pressurized vapor across the extraction source media in the sieve basket.

6. The method of claim 1 wherein the upper section or the lower sections further comprise a port or nozzle adapted to receive a pressurized liquid or the pressurized vapor from the boiler vessel to agitate or add heat to the heated extraction liquid.

7. The method of claim 1 wherein the sieve basket comprises a support structure for a media filter to prevent the extraction source media from passing through the sieve basket.

8. The method of claim 1 further comprising providing a heat exchanger between the boiler vessel and the extraction vessel to regulate temperature of the heated extraction liquid entering the extraction vessel.

9. The method of claim 1 further comprising using the operational program and the array of valves to apply reverse pressure to mitigate extraction media blockages.

10. The method of claim 1 further comprising receiving the extraction liquid by the boiler vessel from a fluid reservoir.

11. The method of claim 1 wherein the extraction vessel further comprises a non-plumbed and removable middle section, wherein the upper, middle and lower sections of the extraction vessel form a single and continuous vapor and liquid tight extraction vessel when assembled.

12. The method of claim 1 further comprising using the operational program and the valves to provide positive vapor pressure into the upper section and lower section to bi-directionally force the heated extraction liquid and the pressurized vapor across the extraction source media in the sieve basket.

13. The method of claim 1 receive via a port or nozzle a pressurized liquid or the pressurized vapor from the boiler vessel to agitate or add heat to the heated extraction liquid in the upper section or the lower section.

14. The method of claim 1 using a support structure and a media filter to prevent the extraction source media from passing through the sieve basket.

15. The method of claim 1 further comprising using a heat exchanger between the boiler vessel and the extraction vessel to regulate temperature of the heated extraction liquid entering the extraction vessel.

* * * * *